INVENTOR.
LOWELL A. LEDGETT
BY
Ronald S. Cornell

INVENTOR.
LOWELL A. LEDGETT
BY
Ronald S. Cornell

INVENTOR.
LOWELL A. LEDGETT
BY
Ronald S. Cornell

Patented July 18, 1972

3,677,714

United States Patent Office 3,677,714
POROUS RING FEED HEAD
Lowell Ashton Ledgett, Ridgewood, N.J., assignor to Colgate-Palmolive Company, New York, N.Y.
Continuation of abandoned application Ser. No. 766,255, Oct. 9, 1968. This application Mar. 17, 1971, Ser. No. 125,416
Int. Cl. B01f 3/02; B01d 47/00; C07f 141/00
U.S. Cl. 23—285                                    6 Claims

ABSTRACT OF THE DISCLOSURE

A reactor for continuously sulfonating or sulfating organic compounds with sulfur trioxide wherein the organic compound is fed through a porous wall having a moderate pressure drop thereacross. The organic compound is then directed to flow in a circumferentially uniform thin film down the inner cylindrical wall or walls of a cooled reaction zone. Low pressure sulfur trioxide contacts the organic compound on the inner surface of the cooled walls and forms a thin film of reaction mixture, and the emerging product is treated by conventional methods.

---

This application is a continuation of my copending application Ser. No. 766,255, filed on Oct. 9, 1968 and now abandoned.

This invention relates to an apparatus for the reaction of sulfur trioxide with a sulfonatable organic compound. More particularly, low vapor pressure sulfur trioxide can be reacted with a sulfonatable or sulfatable organic compound in the apparatus of this invention to produce a product in high yields with a minimum of discoloration. Also achieved by the apparatus of this invention are continuity and stability of reactor operation without mechanical distortion due to thermal and other stress changes in operation than prior art reactors, and charring of product is virtually eliminated.

The reaction of sulfur trioxide with organic compounds is so highly exothermic that the reacting compounds heretofore was often charred, resulting in contamination and discoloration of the product unless the heat of reaction could be effectively dissipated. It has been found that these effects are significantly reduced when an optimally thin film of reaction mixture is established and temperature controlled by cooling throughout the zone where the sulfur trioxide contacts the organic compound. In several patented sulfonation/sulfation film reactors, the thin film of reaction mixture is formed on the surface of a cooled tubular wall of the reactor by passing organic feed through an opening at the reactor wall in the form of orifice slots, gaps, weirs, etc.

A major disadvantage of reactors utilizing orifice slots, gaps, weirs, etc., is that they are expensive to manufacture with the required small dimensions and close tolerance, on the order of 0.010"±0.005", and fine adjustment of clearances and apertures to approach a uniform feed rate per unit of the reactor wall periphery. Experience has shown that dimensional changes in excess of tolerance takes place in assembled feed distributors of common design due to thermal, bolting and other structural stresses resulting in a non-uniform film. Also, such apertures are subject to plugging in depth with charred material formed during reaction requiring the tedious job of dislodging and cleaning. Even if the orifice or slot apertures are not completely plugged, they often become objectionably small with respect to practical tolerances for appreciable pressure drop at the desired uniform flow rates per unit of reactor wall periphery of area.

It is therefore the primary object of the present invention to provide a sulfonation/sulfation film reactor wherein organic material is fed at a uniform and continuous rate through a manifold of uniform pressure in such a manner that the flow of organic feed material per unit length of reactor wall periphery is substantially constant and the desired thickness of reaction mixture film on a cooled reactor wall is established.

It is another object of this invention to provide a reactor for sulfonation or sulfation of organic compounds with sulfur trioxide, wherein the organic material is fed through a porous wall of uniform thickness and porosity at a rate controlled by a moderate pressure drop through the porous wall to assure uniform distribution in a thin film of reaction mixture as flow proceeds down the cooled reactor wall.

It is a further object of the invention to provide a reactor for continuously reacting an organic compound with sulfur trioxide having a porous organic feed surface shielded from entering sulfur trioxide in order to substantially eliminate charring of the organic material being fed before a thin film of reaction mixture contacts a cooled reactor wall.

It is still another object of the invention to provide a reactor for continuously reacting an organic compound with sulfur trioxide having a porous organic feed surface shielded from sulfur trioxide, the porous surface being maintained in a substantially clean condition by preventing accumulation of charred organic material on the porous surface by purging the surface with an inert gas.

In accordance with the objects of the present invention, there is provided a process for the reaction of sulfur trioxide and liquid organic compounds, which process is carried out by feeding sulfur trioxide and organic material into a tubular reactor and contacting the reactants to form a reaction mixture uniformly distributed circumferentially in a thin film about the periphery of the cooled reactor wall, or walls if concentric tubes are used. The organic compound is fed to the reactor through a porous wall of uniform thickness and porosity from a manifold of uniform pressure such that the rate of flow of organic compound per unit length of reactor wall periphery is substantially constant. The flow of feed material is controlled by a moderate pressure drop across the porous wall at a rate sufficient to establish the desired film thickness on the cooled reactor wall. The porous wall is shielded by a skirt from entering sulfur trioxide rarified by vacuum or inert diluent to avoid charring of organic feed due to the highly exothermic nature of its reaction with sulfur trioxide before the film of reactants is in contact with the cooled reactor wall.

Still further objects and features of this invention reside in the provision of a sulfonation/sulfation reactor having a readily removable and replaceable porous organic feed surface which is clean and uniform to use, economical to run, and which gives a high yield of products having improved Acid Mix Klett colors.

These, together with the various ancillary objects and features of this invention, which will become apparent as the following description proceeds, are attained by this reactor, a preferred embodiment of which has been illustrated for a single tube reactor in the accompanying drawings, by way of example only, wherein.

Figure 1:
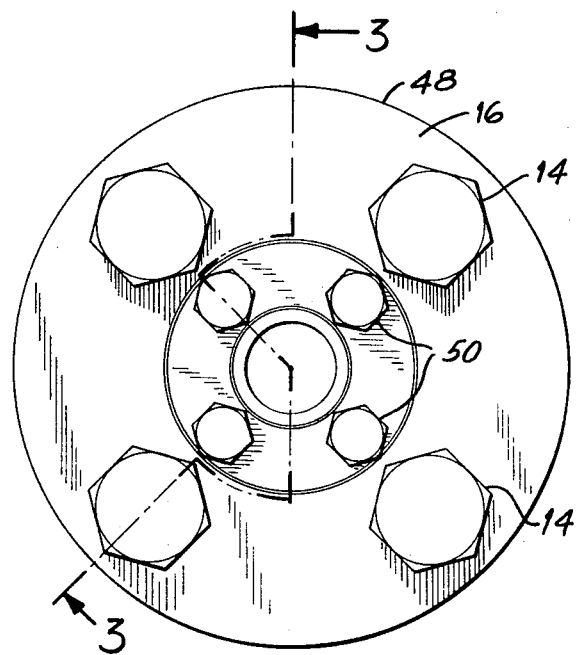
FIG. 1 is a top view of a tubular sulfonation and sulfation reactor constructed in accordance with the concepts of this invention.
Figure 2:
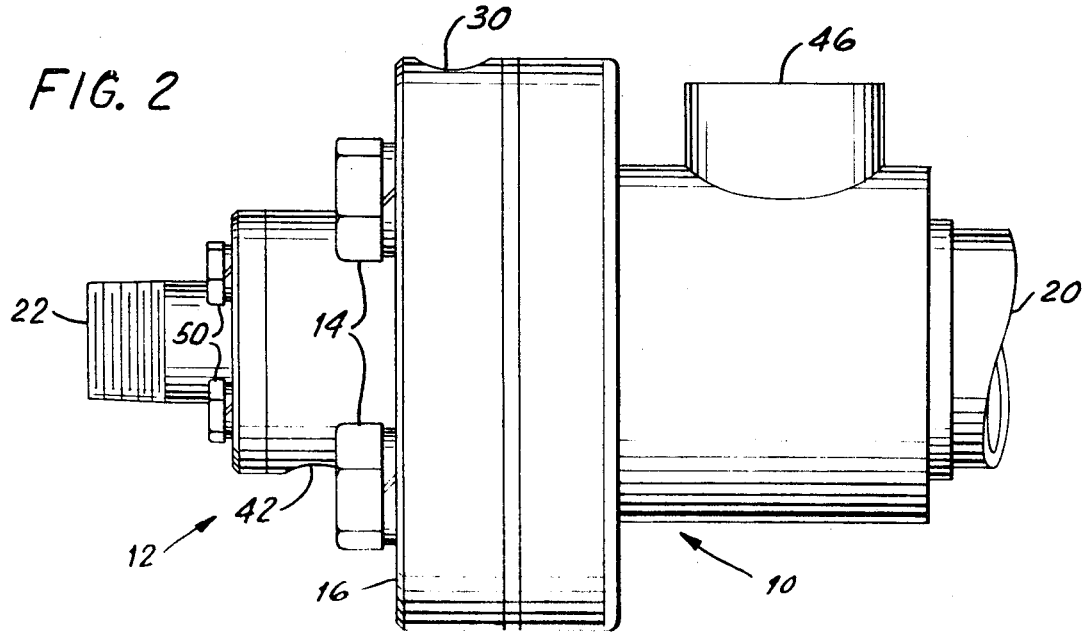
FIG. 2 is a fragmentary side elevational view of the reactor illustrated in FIG. 1.
Figure 3:
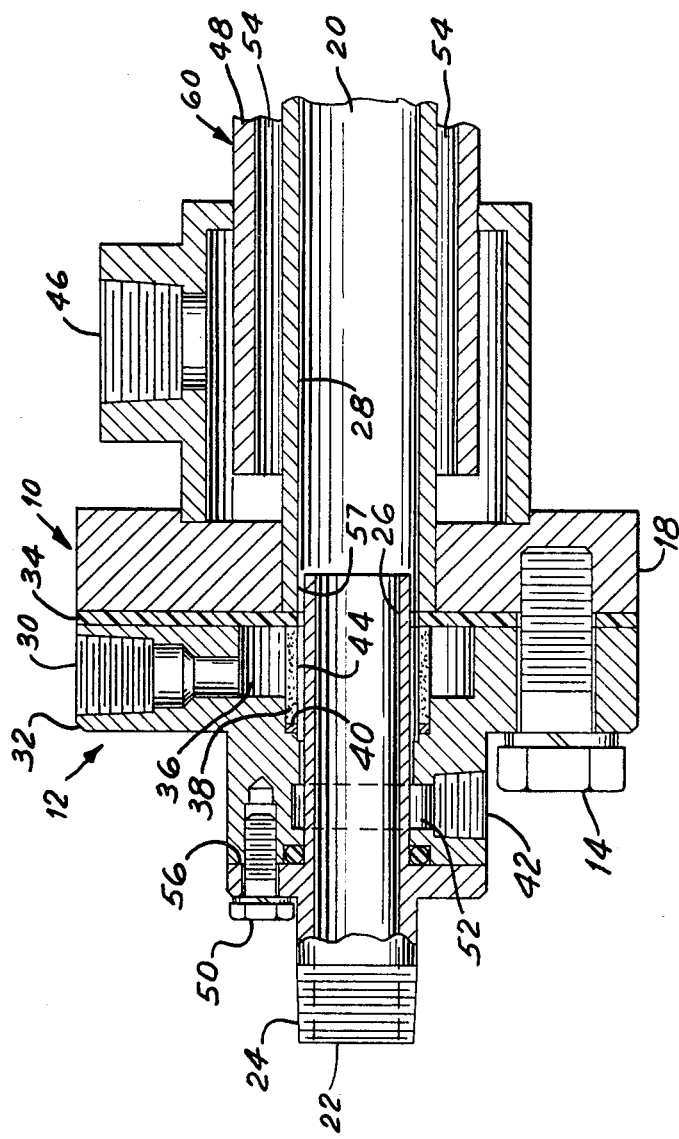
FIG. 3 is a partial fragmentary sectional view of the reactor taken along the plane of lines 3—3 in FIG. 1, parts being broken away to show other parts in detail.

With continuing reference to the accompanying drawings, particularly with reference to FIG. 3, wherein like reference numerals designate similar parts throughout the various views, reference numeral 10 is used to generally designate the reactor of the present invention.

The reactor head, generally designated by reference numeral 12, is conveniently secured to the body 10 of the reactor by equally spaced threaded screws or bolts 14 passing through the head cap 16 to reactor flange 18 for facilitating removal and cleaning. The connection of reactor head 12, flange gasket 34 and body 10 provides an elongated primary central aperture 20. Reactor head 12 is provided with a feed nozzle 22 having screw threads 24 thereon. A cylindrical tube 26 integral with feed nozzle 22 and coaxially extending into primary central aperture defining a reaction chamber 20 provides an isolated chamber for passing sulfur trioxide therethrough. Cylindrical tube 26 is firmly secured by evenly spaced threaded screws or bolts 50 to end wall 56. A liquid organic feed inlet 30 is formed in the reactor head flange 32 and communicates with a ring shaped cavity 36 which is concentric with and of greater diameter than the outer diameter of cylindrical tube 26. A ring 38 of porous material is concentrically positioned between the tube 26 and the ring shaped cavity 36 so that the inner surface of ring 38 which has a diameter equal to the inner diameters of peripheral reactor wall 28 and flange gasket 34 forms an extension of the inner surface of the reactor wall 28. Gaskets 40 and 34 seal both sides of porous ring 38 and secure the ring 38 in its position, thereby assuring a uniform rate of flow of organic material clear of the outer circumference of tube 26 and contacting the inner periphery of the reactor wall 28. Preferably, a purge gas inlet 42 is disposed within the reactor head 10 and is integrally connected to a narrow section of tubing 52 which is concentric with tube 26 for introducing inert gas into the passageway 57 around the outer circumference of tube 26. The reactor wall 28 is cooled by any convenient cooling means, such as by the water cooled jacket shown in FIG. 3 and generally indicated by reference numeral 60. Water or other liquid coolant 54 is introduced into the water cooled jacket at inlet 46 if concurrent flow is desired. The coolant flows through the space defined by the tube 48 and the reactor wall 28. If countercurrent flow of coolant is desired, the direction of flow of coolant would be opposite to that shown, and the coolant would exit through conduit 46.

When the reactor is in operation, sulfur trioxide which is rarified by vacuum or inert gas, such as air, travels from a pipeline threadedly attached to feed nozzle 22 through tube 26. Liquid organic feed material is pumped from a storage tank, not shown, through a stainless steel pipeline to inlet 30. Optionally, a fine porosity filter cartridge may be placed in the feed line supplying the porous wall 38 to insure that passage of contaminants will be minimized and to prevent blockage of the porous wall with the contaminants. Generally, a suitably sized filter cartridge having a porosity not finer than 10 microns does not cause an appreciable pressure drop in the pipeline. Organic feed, sulfonatable or sulfatable alkylates or derivatives thereof, passes through porous ring 38 of uniform thickness and porosity into the passageway surrounding the outer periphery of tube 26. The porous media may be corrosion resistant sintered metal or ceramic material. The rate of passage of feed through the porous ring 38 is controlled by a moderate pressure drop through the ring. Preferably, the porosity of the ring 38 should be between about 20 and 35 microns. In order to maintain a uniform flow through the porous member, its porosity should not exceed about 60 microns. The flow of organic material leaving the surface of ring 38 is uniform and continues circumferentially down the cooled reactor wall 28. In addition, sulfur trioxide is prevented from travelling back into the passageway around tube 26 by the forward motion of inert purge gas toward the area of low pressure. Sulfur trioxide which does diffuse into the passageway may exothermically react with organic material at the exposed surface 44 of the porous ring 38 but is too dilute to cause charring and contamination when the feed material is flowing. The purge gas optimally is in substantially continuous use and serves the additional function of preventing charring of residual material on the porous surface when flow of organic and sulfur trioxide is stopped. The purge gas may be an inert gas, such as desiccated air.

The reactants are contacted at the film surface on the water cooled reactor wall 28 and form a thin film of reaction mixture whose thickness will determine the rate of cooling. Reaction product emerging from the cooled reaction zone is treated by conventional methods. Such methods include the neutralization of the acidic product by a base such as sodium hydroxide.

Figure 4:
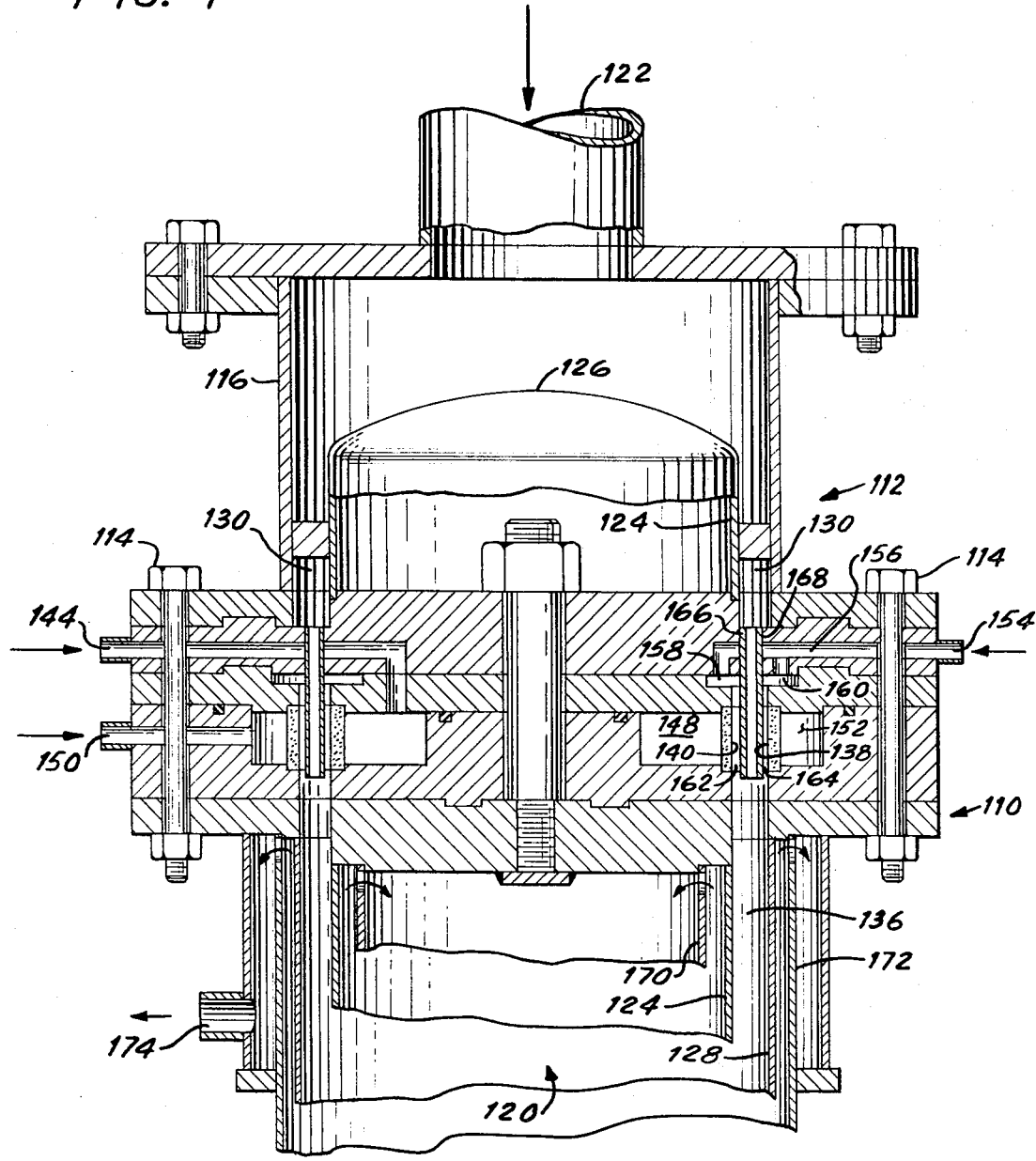
FIG. 4 is a partial fragmentary sectional view of a modified form of the reactor, parts being broken away to show other parts in detail.

Referring now to FIG. 4, the modified reactor head, generally designated by reference numeral 112, differs from reactor head 12 in that it uses concentric porous rings 138 and 140 for feeding liquid organic feed to a ring shaped reaction zone 136 defined by double walls 124 and 128.

The reactor head 112 is conveniently secured to the body 110 of the reactor by equally spaced threaded screws or bolts 114. Reactor head 112 includes an outer cylindrical gas inlet housing 166 which is connected to body 110 providing an elongated primary central aperture 120. Reactor head 112 is also provided with a gas inlet 122. A cylindrical tube 124 having an end wall 126 coaxially extends into primary central aperture 120 and provides an isolated ring shaped chamber 130 for passing sulfur trioxide from inlet 122 to ring shaped reaction zone 136. An inlet 144 for feeding liquid organic material to the inner porous ring 140 is formed in the reactor head and communicates with a ring shaped cavity 148 which is concentrically disposed inside cylindrical tube 124. An inlet 150 for feeding liquid organic material to outer porous ring 138, concentrically positioned with respect to the inner porous ring 140, communicates with a second ring shaped cavity 152. A purge gas inlet 154 is disposed within the reactor head 110 and is integrally connected to opening 156 which is branched into narrow cylindrical sections 158 and 160 concentrically disposed about passageways 162 and 164, respectively. Concentric cylindrical skirts 166 and 168 prevent rarified sulfur trioxide from reacting with organic feed before it reaches the reaction zone 136. Reaction zone 136 is cooled by water flowing through the spaces defined by walls 124 and 128 and their respective fluid jackets 170 and 172, the water draining through outlet 174.

If the organic material being reacted has a tendency to solidify during passage through the porous ring, blockage of the ring may be eliminated if the porous ring is preheated by blowing with steam or hot air or by operating at higher feed temperatures and thoroughly blowing the ring at all shutdowns. It is also possible to prevent solidification of organic material by insulating the porous ring from the cooled reaction chamber.

It should be noted that the described apparatus may be used for any reaction between a gas and a substance as long as the porous ring is permeable towards the material passing through it. The reaction may be exothermic or endothermic. If it is endothermic, the cooling means utilized for exothermic reactions is replaced by suitable heating means.

The following is a comparison between the performance of the slotted cylindrical reactor feed head and the porous ring reactor feed heat shown in FIG. 3 for distributing organic material in a ¾" pilot plant sulfur trioxide reactor:

Test sulfonation run

One run was made using each of the slotted cylinder head and porous ring feed head. Entering sulfur trioxide was mixed with air to give a volume of air of 29.9 s.c.f.m. containing about three percent $SO_3$. Linear dodecyl benzene of presumably uniform composition was used on each run, the material being obtained from the plant in drums. Ten micron cotton cellulose filter elements were installed in the organic and washing lines of the new porous ring feed head.

During the slotted head run, intentional charring was incurred by shutting off the alkylate at the end of the run by allowing the air-$SO_3$ to run for about five minutes. Intentional charring was also promoted after shutting down after the run with the porous head (with the purge air turned off and with air-$SO_3$ running for about 5 minutes followed by shutting off the air and running $SO_3$ for 2 minutes). The porous head of the reactor was washed with super-heated water (220–250° F.) after the charring incident. No charred material was noted after removal of the reactor head. Approximately 5% of the inlet side surface of the porous wall was covered with thread burrs, etc.

The following are the average conditions during the foregoing runs:

| Head | Slotted cylinder | Porous plug |
|---|---|---|
| Time, hours | 3½ | 3¼ |
| $SO_3$ rate (lb./hr.) | 13.00 | 13.12 |
| Alkylate rate (lb./hr.) | 36.93 | 37.09 |
| Vaporizer air (s.c.f.m.) | 25.5 | 25.5 |
| Mixer air (s.c.f.m.) | 4.4 | 4.4 |
| Purge air (s.c.f.h.) | | 15 |
| $SO_3$/alkylate, mol. ratio | 1.039 | 1.043 |

Acid mix samples were taken approximately every half hour during the runs described above. Five grams of acid mix were diluted to 100 cc. with methanol and Klett readings taken. No digestion or hydration was used before neutralizing. The results are shown in the following Table I.

TABLE I

Analyses of acid mix-running samples

| Slotted cylinder: | 20 micron porous ring |
|---|---|
| 24 | 33 |
| 30 | 25 |
| 25 | 22 |
| 25 | 22 |
| 25 | 22 |
| 23 | 25 |
| 28 | 26 |
| | 23 |
| Average 25.7 | 24.8 |

The acid mix from the reactor in the foregoing runs was neutralized with aqueous sodium hydroxide to form an aqueous slurry of sodium dodecylbenzene sulfonate. The solids content of the resulting aqueous slurry was in the range of 53–56% by weight. The analytical data show no significant difference in acid mix colors or sulfonate yields using the two reactor heads. The test runs thereby indicate that the new porous ring feed head performs at least as well as the old slotted cylinder head.

I claim:

1. An apparatus for continuously reacting a substance with a gas comprising, a reactor having a reactor head and a reactor body, said reactor body including at least one reaction chamber therein, each reaction chamber having at least one annular wall which forms a reaction surface, means to feed liquid to an upper portion of each annular wall, said liquid feed means including an annular porous member for each annular wall each porous member being adapted to receive a liquid feed material at one side thereof and to discharge said liquid feed material from the other side thereof, each porous member being positioned adjacent to the uper end of its corresponding reaction surface whereby liquid feed material passes from the porous member, flows onto the upper portion of the reaction surface and flows over the reaction surface as a film, means for delivering a feed gas to said reaction chamber, said feed gas delivery means extending into said reaction chamber from a point above said porous member to a point below said porous member, whereby the feed gas exits from the gas delivery means at a point below said porous member so that it is brought into contact with the film of liquid feed material on each reaction surface and flows concurrently downwardly therewith, said gas delivery means passing in closely spaced relation to each porous member and its corresponding annular wall and conforming in shape thereto, thereby forming an annular space between said feed gas delivery means and each porous member and its corresponding wall, and means for delivering an inert gas through said annular space to said reaction chamber from above each porous member whereby feed gas is prevented from flowing into said annular space.

2. An apparatus according to claim 1, including a cooling water jacket disposed about said chamber for heat transfer to control the temperature of the film.

3. An apparatus according to claim 1, wherein said porous rings are made of a corrosion-resistant sintered metal.

4. An apparatus according to claim 1, including means detachably connecting said reactor head to said reactor body for facilitating removal and replacement of said porous rings.

5. An apparatus for continuously reacting a substance with a gas comprising a reactor having a reactor head and a reactor body, said body having a reaction chamber therein having inner and outer peripheral walls, said reactor head having a first opening therethrough, said body including at least one heat transfer surface concentrically surrounding said reaction chamber, each peripheral wall including in its upper portion a concentric porous ring, said rings being contiguous to but spaced from each other on opposite sides of said reaction chamber, reaction gas inlet means in said first opening for delivering a gas to said chamber, said inlet means being positioned between said porous rings and extending into said chamber beyond said porous rings thereby creating an annular space between the inlet means and each of said porous rings, said reactor head having additional inlet means therein for delivering a liquid substance onto each of said porous rings so that said porous rings distribute said liquid substance uniformly and at a controlled rate throughout to form a uniform film of liquid substance on said peripheral wall of said reaction chamber.

6. An apparatus according to claim 5, including further inlet means in said reactor head for delivering an inert gas to the annular spaces between said porous rings and said reaction gas inlet means.

References Cited

UNITED STATES PATENTS

| 1,881,041 | 10/1933 | Benjamin | 48—224 UX |
| 3,438,720 | 4/1969 | Cleaver | 23—1 |
| 3,482,947 | 12/1969 | Jacobsen et al. | 23—285 |

FOREIGN PATENTS

| 190,561 | 12/1922 | Great Britain | 261—102 |
| 507,575 | 9/1930 | Germany | 261—102 |

JAMES H. TAYMAN, JR., Primary Examiner

U.S. Cl. X.R.

23—283, 1 R, 252 R; 48—Dig. 5; 239—145, 266; 431—326, 328; 261—99; 137—604